United States Patent
Wilhelm et al.

(10) Patent No.: US 11,366,658 B1
(45) Date of Patent: Jun. 21, 2022

(54) SEAMLESS LIFECYCLE STABILITY FOR EXTENSIBLE SOFTWARE FEATURES

(71) Applicant: SAP SE, Walldorf (DE)

(72) Inventors: Georg Wilhelm, Kronau (DE); Daniel Wachs, Mannheim (DE); Fabian Fellhauer, Oestringen (DE); Karsten Schaser, Wiesloch (DE); Christian Holzer, Ubstadt-Weiher (DE); Rene Dehn, Sinsheim (DE); Uwe Schlarb, Oestringen (DE); Christian Fuhlbruegge, Spechbach (DE); Thomas Henn, Stutensee (DE); Matthias Herchenroether, Heidelberg (DE); Thomas Wieczorek, Meckesheim (DE); Daniel Niehoff, Sandhausen (DE); Karsten K. Bohlmann, Rauenberg (DE); Marcel Hermanns, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/151,908

(22) Filed: Jan. 19, 2021

(51) Int. Cl.
*G06F 9/44* (2018.01)
*G06F 8/71* (2018.01)

(52) U.S. Cl.
CPC ...................... *G06F 8/71* (2013.01)

(58) Field of Classification Search
None
See application file for complete search history.

(56) References Cited

U.S. PATENT DOCUMENTS

| | | | |
|---|---|---|---|
| 7,263,697 | B2 | 8/2007 | Acker et al. |
| 7,302,678 | B2 | 11/2007 | Bohlmann et al. |
| 7,406,695 | B2 | 7/2008 | Wilhelm et al. |
| 7,424,685 | B2 | 9/2008 | Behrens et al. |
| 7,505,983 | B2 | 3/2009 | Wildhagen et al. |
| 7,650,597 | B2 | 1/2010 | Bohlmann et al. |
| 7,673,245 | B2 | 3/2010 | Weddeling et al. |

(Continued)

OTHER PUBLICATIONS

U.S. Appl. No. 16/688,941, filed Nov. 19, 2019, Auer et al.

(Continued)

*Primary Examiner* — Wei Y Zhen
*Assistant Examiner* — Lanny N Ung
(74) *Attorney, Agent, or Firm* — Fish & Richardson P.C.

(57) ABSTRACT

The present disclosure involves systems, software, and computer implemented methods for ensuring seamless lifecycle stability for extensions to standard software products. One example method includes determining a requested change to a software feature of a software object. The software feature has been designated as an extensible software feature and is associated with a lifecycle stability contract that identifies aspects of the extensible software feature that are designated to remain stable across different releases of the software object. The lifecycle stability contract is used to perform a compatibility check for the requested change to determine whether the requested change complies with the lifecycle stability contract. The requested change is permitted in response to determining that the requested change complies with the lifecycle stability contract and the requested change is denied in response to determining that the requested change violates the lifecycle stability contract.

19 Claims, 7 Drawing Sheets

(56) References Cited

U.S. PATENT DOCUMENTS

| | | | |
|---|---|---|---|
| 7,730,056 | B2 | 6/2010 | Kaiser et al. |
| 7,870,549 | B2 | 1/2011 | Acker et al. |
| 8,087,030 | B2 | 12/2011 | Stuhec et al. |
| 8,190,461 | B2 | 5/2012 | Hartel et al. |
| 8,417,731 | B2 | 4/2013 | Dehn et al. |
| 8,555,249 | B2 | 10/2013 | Demant et al. |
| 8,572,566 | B2 | 10/2013 | Gass et al. |
| 8,606,799 | B2 | 12/2013 | Dehn et al. |
| 8,621,419 | B2 | 12/2013 | Woodgeard |
| 8,706,776 | B1 | 4/2014 | Kraft et al. |
| 8,863,097 | B2 | 10/2014 | Thimmel et al. |
| 8,924,269 | B2 | 12/2014 | Seubert et al. |
| 9,733,921 | B1 | 8/2017 | Saenz et al. |
| 10,452,646 | B2 | 10/2019 | Schlarb et al. |
| 10,482,080 | B2 | 11/2019 | Auer et al. |
| 10,621,167 | B2 | 4/2020 | Auer et al. |
| 10,657,276 | B2 | 5/2020 | Birn et al. |
| 10,733,168 | B2 | 8/2020 | Schlarb et al. |
| 10,740,315 | B2 | 8/2020 | Birn et al. |
| 10,740,318 | B2 | 8/2020 | Auer et al. |
| 2005/0022161 | A1* | 1/2005 | Burger ................. G06F 8/70 717/108 |
| 2005/0108272 | A1 | 5/2005 | Behrens et al. |
| 2005/0204359 | A1 | 9/2005 | Beunings et al. |
| 2006/0010369 | A1 | 1/2006 | Naundorf et al. |
| 2006/0098647 | A1 | 5/2006 | Muehl et al. |
| 2006/0200803 | A1 | 9/2006 | Neumann et al. |
| 2007/0124797 | A1 | 5/2007 | Gupta et al. |
| 2008/0066049 | A1 | 3/2008 | Jain et al. |
| 2010/0070556 | A1 | 3/2010 | Heusermann et al. |
| 2011/0153505 | A1* | 6/2011 | Brunswig ............. G06Q 10/06 705/301 |
| 2011/0307289 | A1 | 12/2011 | Hosur et al. |
| 2012/0030580 | A1 | 2/2012 | Schlarb et al. |
| 2012/0151439 | A1* | 6/2012 | Demant ................. G06F 8/38 717/120 |
| 2014/0282353 | A1* | 9/2014 | Jubran ................. G06F 8/00 717/101 |
| 2016/0371315 | A1* | 12/2016 | Kwon ................ G06F 16/2282 |
| 2019/0213224 | A1 | 7/2019 | Zhao et al. |
| 2019/0303623 | A1 | 10/2019 | Reddy et al. |
| 2019/0370375 | A1* | 12/2019 | Wachs ................ G06F 16/248 |
| 2019/0384650 | A1 | 12/2019 | Danielsson et al. |
| 2020/0257673 | A1 | 8/2020 | Auer et al. |

OTHER PUBLICATIONS

U.S. Appl. No. 17/073,560, filed Oct. 19, 2020, Schlarb et al.
Khadrouf et al., "ERP System Customization in Moroccan SMEs" 2018 IEEE International Conference on Technology Management, Operations and Decisions, Nov. 2018, 6 pages.
Sap, "In-App Extensibility" Product Management, Powerpoint, Sep. 2020, 31 pages.
Extended European Search Report issued in European Appln. No. 21190733.2 dated Jan. 11, 2022, 10 pages.

* cited by examiner

```
                                   302
                         ┌──────────────────────────────────────────────────┐
                         │ define table business_partner {                  │
              304────────┤   key client              : clnt not null;       │
              306────────┤   key business_partner_id : raw(16) not null;    │
              308────────┤   include business_partner_structure;            │
                         │ }                                                │
                         └──────────────────────────────────────────────────┘
                                         FIG. 3A  300
```

```
            ┌──────────────────────────────────────────────────────────────────┐
            │ @Catalog.enhancement.category    : #EXTENSIBLE_ANY ──── 360      │
            │ @Catalog.enhancement.fieldSuffix : 'ZDD' ──── 356                │
            │ @Catalog.enhancement.quotaMaximumFields  : 100  ──── 358a        │
            │ @Catalog.enhancement.quotaMaximumBytes   : 1000 ──── 358b        │
       358 ─┤ @Catalog.enhancement.quotaShareCustomer  : 50   ──── 358c        │
            │ @Catalog.enhancement.quotaSharePartner   : 50   ──── 358d        │
            │ define structure business_partner_structure {                    │
            │    first_name  : char(30); ┐         ── 352                      │
            │    middle_name : char(30); ├ 354                                 │
            │    last_name   : char(30); ┘                                     │
            │ }                                                                │
            └──────────────────────────────────────────────────────────────────┘
                                         FIG. 3B  350
```

New Append Structure

Structure
  Create Structure

| Project | My_Project |
|---|---|
| Package | My_Package |
| Name | ZZ1_BP_APPEND_STRUCT _402_ |
| Base Structure | business_partner_structure _404_ |

Finish _406_

FIG. 4A _400_

```
          452            456                                         454
extend type business_partner_structure with zz1_bp_append_struct {
    zz1_cust_field_1_zdd : char(5);    458
    zz1_cust_field_2_zdd : char(10);   460
}
```

FIG. 4B _450_

```
                                                502
define root view entity I_CFD_TSM_BUPA_RAP_BO
  as select from cfd_d_tsm_bupa as BusinessPartner
... ⌒504
{
  key BusinessPartner.id      ⌒506         as Id,
      BusinessPartner.gender                as Gender,
                                  508
...
}
```

FIG. 5A 500

```
managed                              552
implementation in class cl_Cfd_tsm_bupa_managed unique;
strict;          554
extensible { with validations on save; }   556
define behavior for I_CFD_TSM_BUPA_RAP_BO alias BusinessPartner
extensible       558
{
  mapping for cfd_d_tsm_bupa corresponding
  {
    correspondenceLanguage = correspondence_language;
  } create;
  update;
  delete;

validation validate_mandatory on save    560
  {
    create; update;
  }

```
                    ┌─602
extension;  ┌─604                           ┌─606
extend behavior for I_CFD_TSM_BUPA_RAP_BO
implementation in class lhc_businesspartner unique
{           ┌─608              ┌─610
    validation zz_is_date_valid on save { create; update; }
}              └─609              └─612    └─614
```

FIG. 6A 600

```
                                    ┌─652
CLASS lhc_businesspartner DEFINITION INHERITING FROM
cl_abap_behavior_handler.
    PRIVATE SECTION.    ┌─653
        METHODS zz_is_date_valid FOR VALIDATE ON SAVE
            IMPORTING keys FOR businesspartner~zz_is_date_valid.
ENDCLASS.
            └─654
                                            ┌─655
CLASS lhc_businesspartner IMPLEMENTATION.
    METHOD zz_is_date_valid.
                        └─656
    ...
    ...   ┌─658                    ┌─────────────────┐
                                   │ Extension Logic │
                                   └─────────────────┘
    ENDMETHOD.
ENDCLASS.
```

FIG. 6B 650

SEAMLESS LIFECYCLE STABILITY FOR EXTENSIBLE SOFTWARE FEATURES

TECHNICAL FIELD

The present disclosure relates to computer-implemented methods, software, and systems for ensuring seamless lifecycle stability for extensions to standard software products.

BACKGROUND

A multi-tenancy software architecture can include a single instance of a software application that runs on a server and serves multiple tenants. A tenant is a group of users who share a common access to the software instance. In a multitenant architecture, the software application can be designed to provide every tenant a dedicated share of the instance—including tenant-specific data (e.g., tenant-specific extensions), configuration, user management, and tenant-specific functionality.

SUMMARY

The present disclosure involves systems, software, and computer implemented methods for ensuring seamless lifecycle stability for extensions to standard software products. An example method includes: determining a requested change to a software feature of a software object, wherein the software feature has been designated as an extensible software feature and is associated with a lifecycle stability contract, wherein the lifecycle stability contract identifies aspects of the extensible software feature that are designated to remain stable across different releases of the software object; using the lifecycle stability contract to perform a compatibility check for the requested change to determine whether the requested change complies with the lifecycle stability contract; permitting the requested change in response to determining that the requested change complies with the lifecycle stability contract; and denying the requested change in response to determining that the requested change violates the lifecycle stability contract.

These are other implementations can include the following features. Prior to determining the requested change to the software feature, methods or operations can include: receiving a release request to release the software object; determining that the software feature of the software object has been designated as the extensible software feature; generating the lifecycle stability contract for the extensible software feature, wherein generating the lifecycle stability contract includes: determining the aspects of the extensible software feature to include in the lifecycle stability contract; and including the determined aspects of the extensible software feature in the lifecycle stability contract, wherein the aspects of the extensible software feature included in the lifecycle stability contract comprise the aspects of the extensible software feature that have been designated to remain stable across different releases of the software object; storing the lifecycle stability contract; and releasing the software object in response to the release request.

A consistency check can be performed on the extensible software feature before generating the lifecycle stability contract. The lifecycle stability contract can be generated in response to determining that the consistency check is successful. The request to release the software object can be declined in response to determining that the consistency check is unsuccessful. The consistency check can include determining whether associated objects that are associated with the extensible software feature have been released. At least one prohibited language feature can be determined that is not allowed in an extension to the extensible software feature and the at least one prohibited language feature can be included in the lifecycle stability contract. An extend request can be received to extend the extensible software feature with a first extension. The lifecycle stability contract can be used to perform a contract check of the first extension. The contract check can include determining whether the first extension includes at least one prohibited language feature included in the lifecycle stability contract. The extend request can be allowed in response to determining that the contract check of the first extension is successful. The extend request can be denied in response to determining that the contract check of the first extension is not successful. The software object can be a table and the extensible software feature can be an include structure that is included in the table. The software object is a class and the extensible software feature can be a method included in the class.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3A illustrates an example table definition.

FIG. 3B illustrates an example include structure definition.

FIG. 4A illustrates an example new append structure user interface.

FIG. 4B illustrates an example append structure definition.

FIG. 5A illustrates an example node definition.

FIG. 5B illustrates an example behavior definition file.

FIG. 6A illustrates an example extension definition.

FIG. 6B illustrates an example class file for an extension.

DETAILED DESCRIPTION

Figure 1:
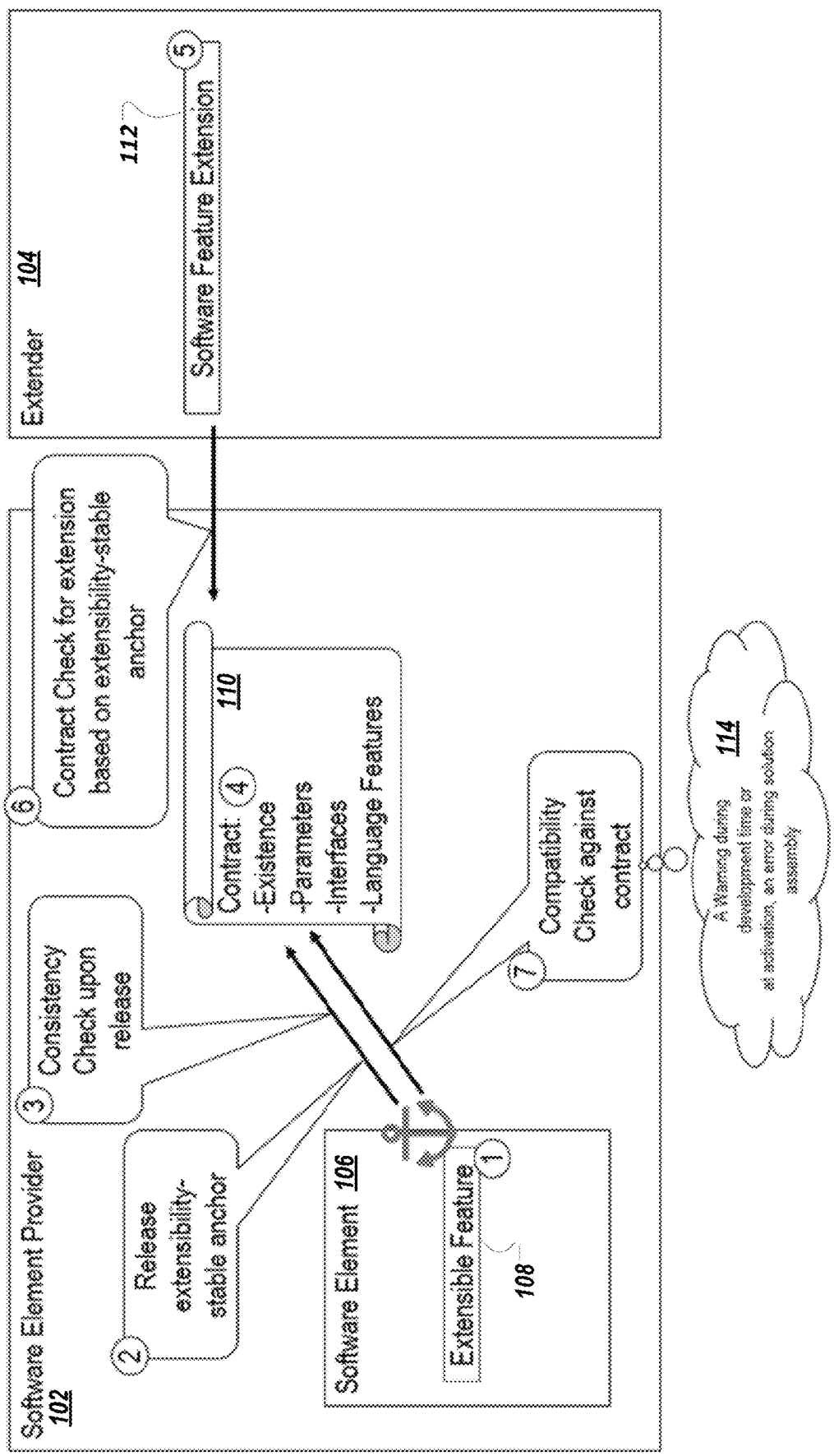
FIG. 1 is a block diagram illustrating an example system for ensuring seamless lifecycle stability for extensions to standard software products.

Customers of a service provider can use a standard software product solution offered by the service provider. The standard product solution can provide support for processes used by different customers. The standard solution can cover main portions of the processes, but customers may adapt the standard solution to fit customer-specific variants of the processes. For example, a customer may typically make one or more extensions to the standard product in order to meet specific needs or requirements of the customer. For example, the customer may add a custom field, a custom table, a custom calculation or validation logic, among others, to add functionality not provided by the standard product, or to otherwise enhance or modify existing functionality.

The service provider can enable the standard product solution to be extensible and can provide various extensibility features. Extensibility features can enable a customer to extend the standard product without negatively affecting functionality included in the standard product. Additionally, after adding extensions, customers generally desire that any extensions made to the standard product continue to work even after the standard product is upgraded or updated.

Traditional products, such as on-premise products, may have been updated on a lesser frequently cycle than newer, cloud-based products. Customers of an on-premise product may have had to deal with or consider maintenance of extensions only every two years, for example (e.g., at major product release boundaries). However, for cloud systems, updates or upgrades can occur on a relatively continual basis. For example, updates to cloud products can occur multiple times per month. The service provider can implement an extensibility framework in a manner such that customers need not be concerned about customer extensions no longer working after an update to a service provider product.

The service provider can identify various extensible software features (e.g., data items, code items) within the product at which or for which the customer can extend the product. Once identified by a developer as extensible, an extensible feature can be referred to as an extensibility-stable anchor. Extensibility-stable anchors can be product features that are kept stable from version to version of the product as different product versions are released. The extensibility-stable anchors can be considered "hook points" at which the customer can extend the product. When a customer extends the product at a hook point, the customer can have confidence that the extension will work in future versions. The service provider can communicate to customers that extending at extensibility-stable anchor points (e.g., hook points) within the product will be a stable change that will continue to work even as other versions of the product are released.

The extensibility solution can provide a technical solution and guarantee for lifecycle stability of both the standard product and customer extensions. The extensibility solution can provide mechanisms for standard product developers to enable extensibility for a software feature and release extensible software features. The extensibility solution can prevent, for example, after an extensible feature is released, standard product developers from changing extensible features in a manner that may be incompatible with extensions a customer may have developed. The extensibility solution can ensure that the extensible feature and other development objects an extender might need to access related to the feature (e.g., keys or passed parameters) are also lifecycle-stable across releases.

The extensibility solution can also provide mechanisms that enable partners or customers to extend the extensible software features. For instance, the extensibility solution can enforce that an extender only accesses lifecycle-stable development objects when defining an extension. As another example, the extensibility solution can ensure that an extension only uses language features that do not harm the standard functionality (e.g., some language features may be prohibited from being used by an extension).

As described in more detail below, the extensibility solution can include consistency and compatibility checks for standard solution developers and contract checks for extension developers. The various checks that are performed can ensure that the following scenarios are technically no longer possible: 1) for the service provider to release a version of an extensible feature that is inconsistent with a contract formed when the feature was released as extensible; and 2) for the extender to create and activate an extension that does not comply with the contract of the extensible feature.

FIG. 1 is a block diagram illustrating an example system 100 for ensuring seamless lifecycle stability for extensions to standard software products. In summary, the system 100 can be used to define what software features provided by a software element provider 102 (e.g., service provider) are extensible, release extensible features, and create lifecycle stability contracts for released extensible features. An extender 104 (e.g., customer or partner) can also use the system 100 to extend a released extensible feature, according to the contract. Additionally, the released feature can only be modified by the software element provider 102 in ways that do not violate the established contract.

In a first phase (e.g., a circled "one"), a developer of a software element 106 at the software element provider 102 can flag, mark, or configure a software feature as extensible, to create an extensible feature 108. The extensible feature 108 can be a data structure, such as a table, or code/logic, such as a method or procedure. As such, an extension can be a structural extension or a functional extension, respectively. Marking can be performed, for example, by adding one or more predefined data definition or coding keywords to the software feature. As another example, the developer can perform an action in a development tool (e.g., selecting a button or menu item) to mark the software feature as extensible. Marking the software feature as extensible to create the extensible feature 108 can be referred to as establishing the extensible feature 108 as an extensibility-stable anchor that is stable across product releases.

The developer (or other developer(s)) at the software element provider 102 can release other related development objects or features that may be needed by the extender 104 when the extender 104 extends the extensible feature 108. For example, the extensible feature 108 may use, interface with, include, or otherwise be associated with one or more other software features. For example, if the extensible feature 108 is a method, the method may accept and use other objects as parameters to the method.

In a second phase, the developer requests a release of the extensibility-stable anchor (e.g., requests a release of the extensible feature 108). For example, the developer can perform a release action using a developer tool. As another example, the developer can check in the software element 106 to a repository.

In a third phase, consistency check(s) are performed in response to the request for the release of the extensibility-stable anchor. The consistency check can be performed to determine whether development object(s) needed for lifecycle stability have been released. That is, a consistency check can determine whether development objects that may be needed by the extender 104 when implementing an extension have also previously been successfully released. For example, a consistency check can determine whether objects included in a method signature have been released. If a consistency check fails, the system 100 can prevent the software element 106 from being released. If all consistency checks pass, the software element 106 can be released.

In a fourth phase, in response to or as part of a successful release of the software element 106, a lifecycle stability contract 110 can be created and stored for the extensible feature 108, as a contract between the software element provider 102 and the extender 104. The lifecycle stability contract 110 can identify the extensible feature 108 as a feature that may be extended by a customer, and as such, a feature that should not be deleted in future releases or changed in a way that might disrupt any customer extension implementations.

Additionally, in response to a developer specifying a given method or event as extensible, the system can automatically determine which other fields, parameters, or interfaces are to remain stable, where the determined items are then added to the contract (e.g., automatically, or recommended to do so). For example, establishing the lifecycle stability contract 110 can include identifying different types of objects or fields that are to remain stable across releases, which can ensure that a given customer implementation of custom logic continues to have access to any objects or fields that may have been used in the customer implementation of the extension. For example, key fields of an object node and fields included in an event or other method signature can be fields that a customer implementation references. Accordingly, key fields and signature fields can be included in the contract, so as to remain stable across releases.

As another example, in response to a developer identifying the extensible feature 108 as extensible, the system 100 can identify information about language features that a customer is to adhere to when developing a customer-specific extension. The system 100 can include the identified language features in the lifecycle stability contract 110. For instance, certain language features can be identified as features that are not allowed in customer extensions. For example, a customer extension may not be allowed to perform a commit statement or perform other types of database operations that might disrupt an overall flow of standard logic, for example. Language features can be identified as not allowed due to lifecycle stability concerns.

In a fifth phase, after the extensible feature 108 is released and the stability lifecycle contract 110 is created, the extender 104 develops a software feature extension 112 that extends the extensible feature 112. For example, the extender 104 can add custom fields to a table or add custom logic to a method, event, or other type of function. The extender 104 can use a development tool provided by the software element provider 102 to code extension logic or custom fields.

In a sixth phase, in response to the extender 104 requesting an activation (or check-in) of the software feature extension 112, a contract check is performed for the software feature extension 112 for compatibility with the lifecycle stability contract 110. The contract check can determine whether the software feature extension 112 violates any compatibility rules defined for the extensible feature 108. For instance, the contract check can determine whether the software feature extension 112 attempts to reference any un-released development objects or use any disallowed language features.

A development tool used by the extender 104 can communicate to the extender 104 in various ways if the software feature extension 112 attempts to use a disallowed language feature included in the lifecycle stability contract 110. For example, if the extender 104 codes an unallowed commit statement and tries to activate the software feature extension 112, the development tool can validate the code against the contract, determine that the code includes the unallowed commit statement, and prevent activation of the software feature extension 112 (e.g., including informing the extender 104 of the unallowed code). As another example, code completion for unallowed statements can be turned off, as a signal to the extender 104 that certain statements are not allowed. Verifying extension code against the lifecycle stability contract 110 can be part of an editor, interpreter, compiler, and/or other development tool.

The contract check can be executed before an extension is checked in and an extension that does not follow an associated contract can be prevented from being checked in and, consequently, from being executed. If the software feature extension 112 is validated by passing the contract check, then the software feature extension 112 can be activated. The software feature extension 112 can be saved for the extender, for example, in a customer-specific (e.g., tenant) area at the software element provider 102. The software feature extension 112 can be first activated in a test environment and then later activated in a production environment.

In a seventh phase, a compatibility check against the lifecycle stability contract 110 is performed after a standard software feature developer attempts to change the extensible feature 108. In general, a compatibility check can be performed against a contract each time a developer makes a change to an object, such as after the object with an extensible feature has been released. For example, a compatibility check can be automatically performed that determines whether the developer has changed an item that is referenced in the contract. For instance, if the compatibility check determines that the developer has changed or removed a field referenced in the contract, the system can prevent the change from being implemented. For example, a development tool such as an editor or build system can communicate an error to the developer that the change or removal of the contract-related field is not allowed, since contract-related fields are to remain stable across releases.

In further detail, the compatibility check can be performed, for example, when a developer tries to save a change to the software element 106. For example, after the extensible feature 108 has been released as an extensibility-stable anchor, the developer can make a change to the extensible feature 108, such as in a code editor or tool, and request a save of the software element 106. Before the software element 106 is saved, the compatibility check can be performed. If the compatibility check passes, the software element 106 can be saved (and later activated). If the compatibility check fails, the change to the software element 106 can remain unsaved and a warning can be communicated to the developer about a detected incompatibility with the lifecycle stability contract 110. The developer can address the incompatibility and attempt another save operation. Compatibility checks can be performed automatically without developer request or intervention. Lifecycle stability can be maintained by preventing developers from being able to disable a compatibility check, for example.

As described in a note 114, in some implementations (e.g., for some products and/or for some releases), a development environment may issue a warning but still allow a save of a change to a software element that violates a contract. In some cases, the developer can also activate the change while receiving a second warning. However, during a later stage, such as when the developer attempts to assemble the change into a new version, an error rather than a warning can be generated, and the system can prevent release of the incompatible change. At whatever level(s) of warnings or restrictions that are employed, the compatibility check can ensure that a change on any development object does not harm enabling of extensions or existing extensions.

Although some scenarios herein are described for standard software element developers, similar procedures and systems can be used by or for partner developers. A partner of a service provider can develop software elements (e.g., tables, objects, procedures) for specific use cases (e.g., specific industries), for example. A service provider customer can use, and also extend, partner-developed objects, as well as standard objects provided by the service provider. A partner developer can introduce a stability anchor into a partner-developed software item, for lifecycle stability with regards to extensions, as described for service provider developed software items.

Figure 2:
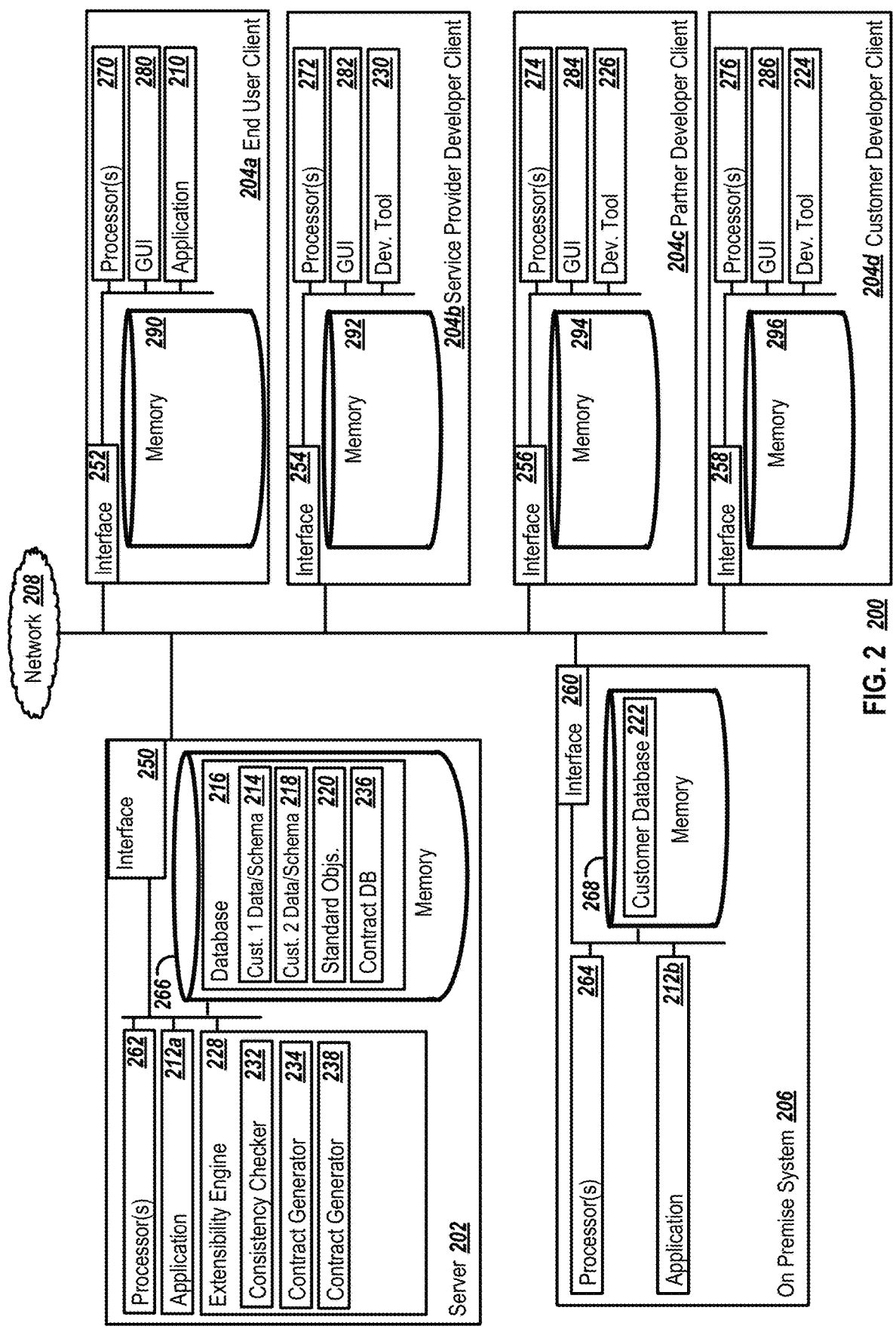
FIG. 2 is a block diagram illustrating an example system for ensuring seamless lifecycle stability for extensions to standard software products.

FIG. 2 is a block diagram illustrating an example system 200 for ensuring seamless lifecycle stability for extensions to standard software products. Specifically, the illustrated system 200 includes or is communicably coupled with a server 202, an end-user client device 204a, a service provider developer client device 204b, a partner developer client device 204c, a customer developer client device 204d, an on-premise system 206, and a network 208.

Although shown separately, in some implementations, functionality of two or more systems or servers may be provided by a single system or server. In some implementations, the functionality of one illustrated system, server, or component may be provided by multiple systems, servers, or components, respectively. For example, the server 202 may incorporate multiple servers that are included in a cloud platform offering that provides one or more cloud applications for use by the end-user client device 204a. As another example, the on-premise system 206 can include multiple servers or systems at a given customer location to provide one or applications accessible by the end-user client device 204a. Although one on-premise system 206 is displayed, multiple different on-premise systems can exist (e.g., at different customer locations).

An end user can use the end-user client device 204a to access an application 210, which may be a client-side version of an application 212a provided by the server 202 or another server-based application hosted by a different server. The end user may be a user for a particular customer of a service provider, and the application 210 may access customer data stored in a customer-specific area 214 of a server database 216, for example. The customer-specific area 214 may be a different area of the server database 216 than an area 218 for another customer. That is, the server 202 can provide customer-specific data areas and schemas for different customers (or tenants). Data shared by multiple customers/tenants can be stored in a standard objects area 220. As another example, the application 210 may be a client-side version of an application 212b included in the on-premise system 206. The application 210 can access customer data in a customer database 222 managed by the on-premise system 206, for example.

As mentioned, customers of a service provider may develop and use extensions to standard products offered by the service provider. For example, a customer developer can use the customer developer client device 204d to open a development tool 224 for defining an extension to a standard object (e.g., an object stored in the standard objects area 220). As another example, a partner developer can use the partner developer client device 204c to open a development tool 226 for defining an extension to a standard object as part of a partner-developed enhancement to a standard product that can be, in turn, made available to customers of the service provider. A partner-developed extension can also, in turn, be extended by the customer (e.g., the customer developer can use the development tool 224 to define a further extension to a partner-developed extension).

The application 212b included in the on-premise system 206 may be updated less frequently than the application 212a provided by the server 202. For example, the application 212a may be a cloud-based application that may be updated multiple times per month and the application 212b may have major updates on a less frequent basis, such as major updates occurring in terms of multiple months or even years. For cloud-based applications, the service provider, customers, and partners may desire and expect that despite frequent updates, customer-developed or partner-developed extensions should remain functioning and stable between service provider application updates.

Accordingly, the service provider can provide an extensibility engine 228 to ensure lifecycle stability for extensions. Although shown as being included in the server 202, some portions of the extensibility engine 228 can be included in the development tool 224, the development tool 226, and/or a development tool 230 running on the service provider developer client device 204b and used by a service provider developer. The development tools 224, 226, and 230 can include extensibility engine functionality and/or communicate with the extensibility engine 228 as appropriate.

When developing a standard object or software element, a service provider developer can use the development tool 230 to mark a software feature as extensible. The service provider developer can request a release of the software element and other software elements or objects related to or used by or with the software element. In response to a release request, a consistency checker 232 can perform a consistency check, as described above for the second phase of FIG. 1. If the consistency check is successful, a contract generator 234 can generate a lifecycle stability contract for the software feature and store the lifecycle stability contract in a contracts database 236. The lifecycle stability contract can specify terms which apply for extensions and further development of the software feature which has been released as a lifecycle-stable anchor. If the consistency check is unsuccessful, the consistency checker 232 can inform the service provider developer (e.g., using or within the development tool 230).

When a customer developer (or a partner developer) extends the software feature, a contract checker 238 can check the extension against the lifecycle stability contract, as described above for phase six of FIG. 1. If the extension violates the contract, the contract checker 238 can inform the customer developer or the partner developer, (e.g., using or within the development tool 224 or the development tool 226, respectively). If the extension does not violate the contract, the extension can be saved (e.g., in the customer-specific area 214), activated, and used, for example, by the application 210.

After releasing the software feature as a lifecycle-stable anchor, the service provider developer who develops the software feature may make change(s) to the software feature, such as for a future product or application release. The contract checker 238 can perform a compatibility check to ensure that the changes do not violate the lifecycle stability contract, as described above for phase seven of FIG. 1. If the change(s) violate the contract, the extensibility engine 228 can prevent inclusion of the change(s) in a production release, and inform the service provider developer (e.g., using or within the development tool 230). If the change(s) do not violate the contract, the updated software feature can be saved, activated, and included in the future production release.

As used in the present disclosure, the term "computer" is intended to encompass any suitable processing device. For example, although FIG. 2 illustrates a single server 202 and one of each of the different types of client devices 204a-204d, the system 200 can be implemented using a single, stand-alone computing device, two or more servers 202, or multiples of different types of client devices 204a-204d. Indeed, the server 202 and each client device 204a-d may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 202 and the client devices 204a-d may be adapted to execute any operating system, including Linux, UNIX, Windows, Mac OS®, Java™, Android™, iOS or any other suitable operating system. According to one implementation, the server 202 may also include or be communicably coupled with an e-mail server, a Web server, a caching server, a streaming data server, and/or other suitable server.

Interfaces 250, 252, 254, 256, 258, and 260 are used by the server 202, the client devices 204a-204d, and the on-premise system 206, respectively, for communicating with other systems in a distributed environment—including within the system 200—connected to the network 208. Generally, the interfaces 250, 252, 254, 256, 258, and 260 each comprise logic encoded in software and/or hardware in a suitable combination and operable to communicate with the network 208. More specifically, the interfaces 250, 252, 254, 256, 258, and 260 may each comprise software supporting one or more communication protocols associated with communications such that the network 208 or interface's hardware is operable to communicate physical signals within and outside of the illustrated system 200.

The server 202 and the on-premise system 206 each respectively include one or more processors 262 or 264. Each processor in the processor(s) 262 or 264 may be a central processing unit (CPU), a blade, an application specific integrated circuit (ASIC), a field-programmable gate array (FPGA), or another suitable component. Generally, each processor in the processor(s) 262 or 264 executes instructions and manipulates data to perform the operations of the server 202 or the on-premise system 206, respectively. Specifically, each processor in the processor(s) 262 or 264 executes the functionality required to receive and respond to requests from the end-user client device 204a, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 202 and the on-premise system 206 respectively include memory 266 or 268. In some implementations, the server 202 and/or the on-premise system 206 includes multiple memories. Each of the memory 266 and 268 may include any type of memory or database module and may take the form of volatile and/or non-volatile memory including, without limitation, magnetic media, optical media, random access memory (RAM), read-only memory (ROM), removable media, or any other suitable local or remote memory component. Each of the memory 266 and 268 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 202 or the on-premise system 206, respectively.

Each client device 204a-204d may generally be any computing device operable to connect to or communicate with the server 202 via the network 208 using a wireline or wireless connection. In general, each client device 204a-204d comprises an electronic computer device operable to receive, transmit, process, and store any appropriate data associated with the system 200 of FIG. 2. Each client device 204a-204d can include one or more client applications, including the application 210, the development tool 224, the development tool 226, and the development tool 230, respectively. A client application is any type of application that allows a respective client device to request and view content on the client device. In some implementations, a client application can use parameters, metadata, and other information received at launch to access a particular set of data from the server 202. In some instances, a client application may be an agent or client-side version of the one or more enterprise applications running on an enterprise server.

Each client device 204a-204d respectively includes processors 270, 272, 274, or 276. Each processor in the processors 270, 272, 274, or 276 may be a central processing unit (CPU), an application specific integrated circuit (ASIC), a field-programmable gate array (FPGA), or another suitable component. Generally, each processor in the processors 270, 272, 274, or 276 executes instructions and manipulates data to perform the operations of the respective client device 204a-204d. Specifically, each processor in the processors 270, 272, 274, or 276 can execute functionality required to send requests to the server 202 and to receive and process responses from the server 202.

Each client device 204a-204d is generally intended to encompass any client computing device such as a laptop/notebook computer, wireless data port, smart phone, personal data assistant (PDA), tablet computing device, one or more processors within these devices, or any other suitable processing device. For example, each client device 204a-204d may comprise a computer that includes an input device, such as a keypad, touch screen, or other device that can accept user information, and an output device that conveys information associated with the operation of the server 202, or the client device itself, including digital data, visual information, or a GUI 280, 282, 284, or 286, respectively.

Each GUI 280, 282, 284, or 286 interfaces with at least a portion of the system 200 for any suitable purpose, including generating the application 210, the development tool 224, the development tool 226, and the development tool 230, respectively. In particular, each GUI 280, 282, 284, or 286 may be used to view and navigate various Web pages, or other user interfaces. Generally, each GUI 280, 282, 284, or 286 provides the user with an efficient and user-friendly presentation of business data provided by or communicated within the system. Each GUI 280, 282, 284, or 286 may comprise a plurality of customizable frames or views having interactive fields, pull-down lists, and buttons operated by the user. Each GUI 280, 282, 284, or 286 contemplates any suitable graphical user interface, such as a combination of a generic web browser, intelligent engine, and command line interface (CLI) that processes information and efficiently presents the results to the user visually.

Memory 290, 292, 294, and 296 included in the client devices 204a-204d, respectively, may include any memory or database module and may take the form of volatile or non-volatile memory including, without limitation, magnetic media, optical media, random access memory (RAM), read-only memory (ROM), removable media, or any other suitable local or remote memory component. Each memory 290, 292, 294, and 296 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of client devices 204a, 204b, 204c, or 204d associated with, or external to, the system 200. For example, while the illustrated system 200 includes one of each client device 204a-204d, alternative implementations of the system 200 may include multiple client devices of different types communicably coupled to the server 202 and/or the network 208, or any other number suitable to the purposes of the system 200. Additionally, there may also be one or more additional client devices external to the illustrated portion of system 200 that are capable of interacting with the system 200 via the network 208. Further, the term "client", "client device" and "user" may be used interchangeably as appropriate without departing from the scope of this disclosure. Moreover, while the client device 204 is described in terms of being used by a single user, this disclosure contemplates that many users may use one computer, or that one user may use multiple computers.

FIG. 3A illustrates an example table definition 300. As mentioned, the service provider can define a software feature so as to be extensible, and thereby designate the software feature as a lifecycle-stable anchor. A table can be designated as extensible, for example. Other software elements, such as objects, can be extended, as described below.

A structural extension can include adding a custom field to a table or an object node. For example, an object type may be sales order, and the sales order object may have or be otherwise associated with different nodes such as a sales order header and one or more sales item nodes. A customer may wish to sort sales orders based on priority. A standard sales order header may not have a priority field, however, so the customer can extend the sales order header node by adding a custom priority field. As another example, for the example table definition 300, the customer may wish to extend a business_partner table to add a custom field to a business_partner header node.

The table definition 300 defines a table name 302 of business_partner, a client key field 304, and a business partner identifier key field 306. The table definition 300 also includes an include structure reference 308 that refers to an include structure. Field extensions can be accomplished using the include structure. The include structure reference 308 refers to an include structure defined below in FIG. 3B. The include structure can be designated as a lifecycle-stable anchor for a structural extension such as extension of a table, as described below.

FIG. 3B illustrates an example include structure definition 350. The include structure definition 350 includes a definition statement for a business_partner_structure include structure 352. The business_partner_structure include structure 352 corresponds to the include structure reference 308 described above with respect to FIG. 3A. The business_partner_structure include structure 352 includes standard first name, middle_name, and last name fields 354. Although standard fields are shown as included in the business_partner_structure include structure 352, an include structure included in an object for extensibility can be empty. When a customer adds a custom field, the custom field can be appended to the include structure. The custom field can then be available for the customer.

The include structure definition 350 can include various parameters related to extensibility. For example, the include structure definition 350 includes a field suffix 356 that defines a string that can be appended to custom fields that get added to the include structure, to avoid naming collisions, for example, between other extensions made by the customer (or by partners).

The include structure definition 350 also includes quota parameters 358, including a maximum fields quota 358a, a maximum bytes quota 358b, a customer share parameter 358c, and a partner share parameter 358d. The maximum fields quota 358a and the maximum bytes quota 358b define how many fields or bytes a customer can add to the include structure, respectively. The customer share parameter 358c and the partner share parameter 358d define a percentage share of the allowed extension fields and bytes between customers and partners, respectively.

The include structure definition 350 includes an enhancement category value 360 of "#EXTENSIBLE_ANY". An enhancement category can specify which types of custom fields can be added to the include structure. The value 360 of #EXTENSIBLE_ANY indicates that all types, including character, numeric, etc., are supported. Other category values can be specified to allow only certain types of extension fields. Adding the value 360 of #EXTENSIBLE_ANY to the include structure definition 350 can mark the business_partner_structure include structure 352 as an extensible feature.

As described, after the developer has defined a software feature and configured a lifecycle-stable anchor (e.g., configuring an include structure as extensible and configuring parameters for the include structure), the developer can request that the software feature is to be released. Part of releasing a software feature after a lifecycle-stable anchor is introduced can be creation of a contract for the software feature. The contract for an include structure can include or refer to existence of and parameters for the include structure. Additionally, the system can determine where, in the software product, that the include structure is referenced as part of customer-facing interfaces, such as part of a method signature, a view, or a service interface. Reference locations can be included as part of the contract. After a customer extends the include structure to include a custom field, the custom field can be available by, in, or for the interface that uses the include structure.

After the include structure has been released, the developer of the include structure or an object that uses the include structure may work on (e.g., make change(s) to) the include structure or an object that uses the include structure, such as when working on a next version of a software product. Part of releasing a next version of the include structure or other object can include performing a compatibility check against the contract established for the include structure to determine whether any change(s) violate the contract.

For the example of the include structure definition 350, the developer may perform an incompatible change by attempting to delete or rename the include structure definition, by changing a parameter of the include structure, such as by reducing a number of maximum fields, by restricting an enhancement category to only include certain types of fields (e.g., on text fields), or by changing customer-partner share arrangements. Any of these incompatible changes can be detected by the compatibility check, and appropriate errors or warnings can be issued, and appropriate measures can be taken to ensure that the incompatible change(s) are not included in a next release of the product.

FIG. 4A illustrates an example new append structure user interface 400. The new append structure user interface 400 can be displayed in response to an extender (e.g., customer, partner) developer selecting a node or object name in a development tool and selecting to add an append structure or otherwise extend the node. The development tool can be configured so that an option to extend the node is only available to an extender after an extensible node has been released and a contract has been established, for instance, for an include structure.

The extender developer can provide a name 402 for an append structure that is to be added to a base structure 404. The append structure can include custom fields added by the extender, for example. The extender developer can select a finish button 406 to enable definition of the append structure, as described below.

FIG. 4B illustrates an example append structure definition 450. An extend keyword 452 in the append structure definition 450 indicates that an append structure 454 is an extension of a base structure 456. The extender developer has added a first custom field 458 and a second custom field 460, which each have a "zdd" suffix corresponding to the field suffix 356 described above with respect to FIG. 3B. The first custom field 458 and the second custom field 460 each also include a "zzl" namespace prefix specific to the extender. The namespace prefix can be used to prevent field name collisions between standard fields and extension fields, for example. After configuring the append structure definition 450, the extender can save and activate the extension. As mentioned above, a contract check can be performed to ensure that the extension complies with a contract established for the base structure 456.

Alternatively or in addition to configuring structural extensions, a customer may wish to configure a functional extension. A functional extension can be custom logic for validation or determination logic, for example. In some implementations, method or events can be designated as determinations (e.g., determining one or more attributes of an object), validations (e.g., validating one or more attributes of an object), or actions (e.g., performing other activities). A service provider programming model can be based on an object framework and each object can include a number of events or other methods that can include standard logic and which also can be designated as extensible for enabling custom logic.

For instance, an object can have a before-save event that gets invoked before an object is saved. The before-save event can be coded to include logic to check the object to determine whether a save should be allowed on the object, for example. A standard software solution can include default logic in a standard implementation of a before-save event. The standard implementation can include validation logic to check various consistency rule(s) to ensure that the object has a valid state before being saved. A customer may wish to define custom logic, in a functional extension, that is to be invoked as part of before-save processing. The custom logic can include validation of customer-specific consistency rules, for example. The custom logic can be performed along with the standard logic. Custom logic can be performed after the standard logic, for example.

As with a structural extension, the service provider can provide an extensibility-stable anchor/hook point, for enabling a functional extension. The extensibility-stable anchor can ensure that the custom logic is executed, and executes correctly, in future releases of the product.

To define the extensibility-stable anchor for a functional extension, a developer of the object can specify, that for a given object node and a given event or method, that the event or method is extensible by customers. Specifying the event or method as extensible identifies the event or method as being associated with a lifecycle stability contract that the service provider will honor.

FIG. 5A illustrates an example node definition 500. The node definition 500 can be for a business partner header node for a business partner object. The node definition 500 can include a technical name 502 for the business partner header node. A field list 504 includes a definition for a business partner identifier key field 506 and a gender non-key field 508. Handling of key fields is described in more detail below. Key fields for the business partner header node can be included in a lifecycle stability contract for ensuring lifecycle stability of extensions of the business partner object, for example. Behavior for the business partner object can be defined in a behavior definition file.

FIG. 5B illustrates an example behavior definition file 550. A class reference 552 indicates in which class the business partner object is implemented. The service provider developer (e.g., developer of the business partner object) can implement the standard behavior of the business partner object in a class implementation file (not shown). A first extensible keyword 554 in the behavior definition file 550 indicates that the business partner object is extensible. That is, the first extensible keyword 554 indicates that each node of the business object, including a business partner header node 556, can be extended. In particular, validations that are fired in response to a save event can be extended. Other types of extensibility declarations can be used to declare that nodes can be extended for determinations, or actions, and in response to other types of events, such as on-modify rather than on-save, for example.

Each node, including the business partner header node 556, can include a second extensible keyword 558 if the developer desires to configure a respective node as extensible. For instance, for a sales order object, a developer may configure a sales order header node as extensible but not configure a sales order item node as extensible. The business partner header node includes an on-save event 560, which, based on the second extensible keyword 558, is extensible by extender developers.

For the business partner header node, the second extensible keyword 558 can serve as the extensibility-stable anchor for the node and can trigger contract generation the first time the business partner header node 556 is released with the second extensible keyword 558. In general, if a service provider developer has configured at least one node as extensible and releases a class, the extensibility configurations that have been configured can be included in a lifecycle stability contract for the class. Once the class has been released, the extensibility configurations for the class that are included in the contract cannot be removed or changed. For example, a node that is flagged as extensible cannot be deleted or later marked as non-extensible. The contract can ensure that the second extensible keyword 558 is not later removed, for example. Additional extensibility configurations can be added, such as to define an additional node as being extensible, but released extensibility configurations are to be maintained, for lifecycle stability. Additionally, key fields for the node, such as the business partner identifier key field 506, can be included in the contract. For example, once the on-save method is released as an extensible feature, key fields of the node can become part of the API or signature exposed to the extender. Accordingly, key fields cannot be later modified or removed, since extender code in an extension may rely on the existence, identify, and type of the key field(s).

After an extensible node is released, a compatibility check can be performed each subsequent time a service provider developer changes the standard event or method. If the compatibility check determines that the change is in violation of the contract, the system can prevent the change from being activated. For the on-save event of the business partner header node 556, an incompatible change may be attempting to delete or rename the business partner header node, turn off extensibility for the node, remove, rename or otherwise change key fields, or remove, rename or otherwise change other signature fields of the on-save event. The compatibility check can ensure that a service provider developer cannot activate a change that violates the contract.

FIG. 6A illustrates an example extension definition 600. After an extensible event or other method is released, a customer or partner developer can select an option, for example, in a developer tool, for a new behavior extension. The developer tool can enable the customer or partner developer to create and/or modify the extension definition 600. An extension keyword 602 indicates that the extension definition 600 corresponds to an extension of a standard (or in some cases partner) software item. An extend-behavior keyword phrase 604 indicates that the extension definition is for extending behavior of a business partner header node 606.

A validation declaration 608 has been added to indicate that the on-save event of the business partner header node 606 is being extended using a zz_is_date_valid method 609. Custom behavior for the extension can be found in a specified class 610. A create keyword 612 and an update keyword 614 are specified to indicate the custom on-save behavior is to be invoked when a business partner header node is created or updated, respectively.

FIG. 6B illustrates an example class file 650 for an extension. The class file 650 includes a class definition 652 corresponding to the specified class 610. The class definition 652 includes a method declaration 653 corresponding to the zz_is_date_valid method 609. The method declaration 653 indicates that the zz_is_date_valid method includes keys 654 of the business partner header node as part of the method signature. Since the zz_is_date_valid method logic may utilize the received keys, the keys for the extensible business partner header node have been included in the lifecycle stability contract created for the business partner header node.

The class file 650 includes a class implementation 655, including an implementation 656 for the zz_is_date_valid method. The customer or partner developer can code appropriate custom extension logic 658, using, for example, key fields or other attributes which have been released. If the customer or partner developer attempts to include prohibited language features, the development tool can inform the developer that such features are not allowed. Code completion disabling, warning messages, or other approaches can be used. That is, a contract check can be performed at various times, such as in real time in response to code entering or upon a save, check-in, or activation attempt, for example.

Figure 7A:
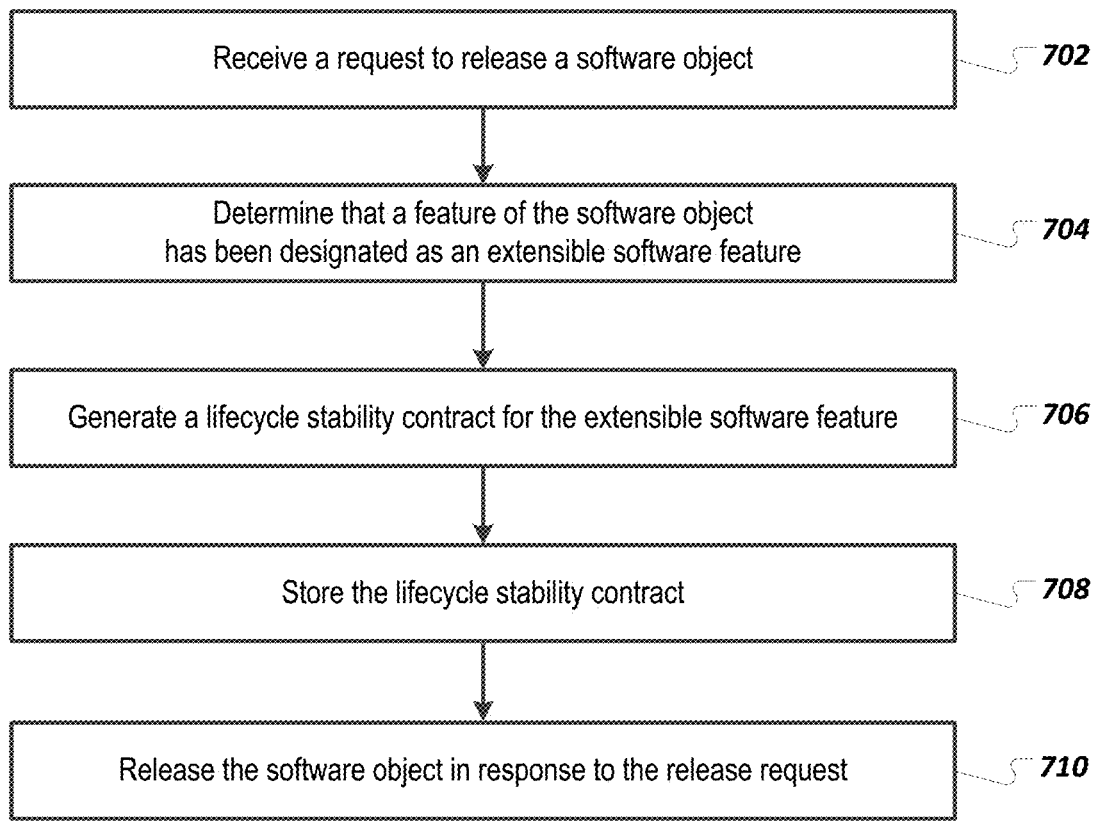
FIG. 7A-7B are flowcharts of example methods for ensuring seamless lifecycle stability for extensions to standard software products.
Figure 7B:
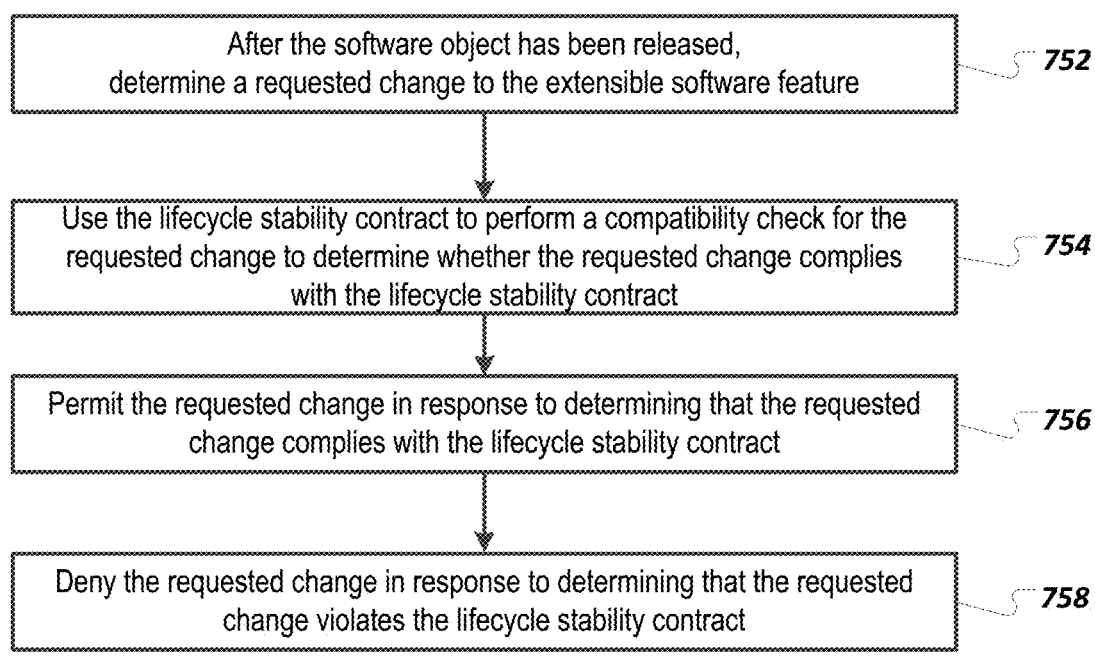

FIGS. 7A-7B are flowcharts of example methods 700 and 750 for ensuring seamless lifecycle stability for extensions to standard software products. It will be understood that methods 700 and 750 and related methods may be performed, for example, by any suitable system, environment, software, and hardware, or a combination of systems, environments, software, and hardware, as appropriate. For example, one or more of a client, a server, or other computing device can be used to execute methods 700 and 750 and related methods and obtain any data from the memory of a client, the server, or the other computing device. In some implementations, the methods 700 and 750 and related methods are executed by one or more components of the system 200 described above with respect to FIG. 2. For example, the methods 700 and 750 and related methods can be executed by the extensibility engine 228 of FIG. 1.

At 702, a release request to release a software object is received.

At 704, a determination is made that a feature of the software object has been designated as an extensible software feature. The software object can be a table and the extensible software feature can be an include structure that is included in the table. As another example, the software object can be a class and the extensible software feature can be a method included in the class.

At 706, a lifecycle stability contract is generated for the extensible software feature. Generating the lifecycle stability contract can include determining aspects of the extensible software feature to include in the lifecycle stability contract and including the determined aspects of the extensible software feature in the lifecycle stability contract. The aspects of the extensible software feature included in the lifecycle stability contract can include aspects of the extensible software feature that are designated to remain stable across different releases of the software object. Aspects can include an identity (e.g., name) and existence of the extensible software feature, parameters or fields of the extensible software feature, and references to locations in which the extensible software feature is used. One or more prohibited language features that are not allowed in an extension to the extensible software feature can be determined and included in the lifecycle stability contract.

A consistency check can be performed on the extensible software feature before generating the lifecycle stability contract. The lifecycle stability contract can be generated in response to determining that the consistency check is successful. The request to release the software object can be declined in response to determining that the consistency check is unsuccessful. The consistency check can include determining whether associated objects that are associated with the extensible software feature have been released.

At 708, the lifecycle stability contract is stored.

At 710, the software object is released in response to the release request.

Referring now to FIG. 7B, at 752, after the software object has been released, a requested change to the extensible software feature is determined.

At 754, the lifecycle stability contract is used to perform a compatibility check for the requested change to determine whether the requested change complies with the lifecycle stability contract.

At 756, the requested change is permitted in response to determining that the requested change complies with the lifecycle stability contract.

At 758, the requested change is denied in response to determining that the requested change violates the lifecycle stability contract.

An extend request can be received to extend the extensible software feature with a first extension. The lifecycle stability contract can be used to perform a contract check of the first extension. The contract check can include determining whether the first extension includes at least one prohibited language feature included in the lifecycle stability contract. The extend request can be allowed or denied in response to determining that the contract check of the first extension is successful or unsuccessful, respectively.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   determining at least one prohibited language feature that is not allowed in an extension to a software feature of a software object, wherein the software feature has been designated as an extensible software feature and is associated with a lifecycle stability contract, wherein the lifecycle stability contract identifies aspects of the extensible software feature that are designated to remain stable across different releases of the software object;
   including the at least one prohibited language feature in the lifecycle stability contract;
   determining a requested change to the software feature of the software object;
   using the lifecycle stability contract to perform a compatibility check for the requested change to determine whether the requested change complies with the lifecycle stability contract;
   permitting the requested change in response to determining that the requested change complies with the lifecycle stability contract; and
   denying the requested change in response to determining that the requested change violates the lifecycle stability contract.

2. The computer-implemented method of claim 1, wherein, prior to determining the requested change to the software feature, the method comprises:
   receiving a release request to release the software object;
   determining that the software feature of the software object has been designated as the extensible software feature;
   generating the lifecycle stability contract for the extensible software feature, wherein generating the lifecycle stability contract includes:
      determining the aspects of the extensible software feature to include in the lifecycle stability contract; and
      including the determined aspects of the extensible software feature in the lifecycle stability contract, wherein the aspects of the extensible software feature included in the lifecycle stability contract comprise the aspects of the extensible software feature that have been designated to remain stable across different releases of the software object;
   storing the lifecycle stability contract; and
   releasing the software object in response to the release request.

3. The computer-implemented method of claim 2, further comprising performing a consistency check on the extensible software feature before generating the lifecycle stability contract.

4. The computer-implemented method of claim 3, further comprising:
   generating the lifecycle stability contract in response to determining that the consistency check is successful; and
   declining the request to release the software object in response to determining that the consistency check is unsuccessful.

5. The computer-implemented method of claim 4, wherein the consistency check comprises determining whether associated objects that are associated with the extensible software feature have been released.

6. The computer-implemented method of claim 1, further comprising receiving an extend request to extend the extensible software feature with a first extension.

7. The computer-implemented method of claim 6, further comprising using the lifecycle stability contract to perform a contract check of the first extension, wherein the contract check comprises determining whether the first extension includes at least one prohibited language feature included in the lifecycle stability contract.

8. The computer-implemented method of claim 7, further comprising:
   allowing the extend request in response to determining that the contract check of the first extension is successful; and
   denying the extend request in response to determining that the contract check of the first extension is not successful.

9. The computer-implemented method of claim 1, wherein the software object is a table and the extensible software feature is an include structure that is included in the table.

10. The computer-implemented method of claim 1, wherein the software object is a class and the extensible software feature is a method included in the class.

11. A system comprising:
    one or more computers; and
    a non-transitory computer-readable medium coupled to the one or more computers having instructions stored thereon which, when executed by the one or more computers, cause the one or more computers to perform operations comprising:
- determining at least one prohibited language feature that is not allowed in an extension to a software feature of a software object, wherein the software feature has been designated as an extensible software feature and is associated with a lifecycle stability contract, wherein the lifecycle stability contract identifies aspects of the extensible software feature that are designated to remain stable across different releases of the software object;
- including the at least one prohibited language feature in the lifecycle stability contract;
- determining a requested change to the software feature of the software object;
- using the lifecycle stability contract to perform a compatibility check for the requested change to determine whether the requested change complies with the lifecycle stability contract;
- permitting the requested change in response to determining that the requested change complies with the lifecycle stability contract; and
- denying the requested change in response to determining that the requested change violates the lifecycle stability contract.

12. The system of claim 11, wherein, prior to determining the requested change to the software feature, the operations comprise:
- receiving a release request to release the software object;
- determining that the software feature of the software object has been designated as the extensible software feature;
- generating the lifecycle stability contract for the extensible software feature, wherein generating the lifecycle stability contract includes:
  - determining the aspects of the extensible software feature to include in the lifecycle stability contract; and
  - including the determined aspects of the extensible software feature in the lifecycle stability contract, wherein the aspects of the extensible software feature included in the lifecycle stability contract comprise the aspects of the extensible software feature that have been designated to remain stable across different releases of the software object;
- storing the lifecycle stability contract; and
- releasing the software object in response to the release request.

13. The system of claim 12, wherein the operations further comprise performing a consistency check on the extensible software feature before generating the lifecycle stability contract.

14. The system of claim 12, wherein the operations further comprise:
- generating the lifecycle stability contract in response to determining that the consistency check is successful; and
- declining the request to release the software object in response to determining that the consistency check is unsuccessful.

15. The system of claim 14, wherein the consistency check comprises determining whether associated objects that are associated with the extensible software feature have been released.

16. A computer program product encoded on a non-transitory storage medium, the product comprising non-transitory, computer readable instructions for causing one or more processors to perform operations comprising:
- determining at least one prohibited language feature that is not allowed in an extension to a software feature of a software object, wherein the software feature has been designated as an extensible software feature and is associated with a lifecycle stability contract, wherein the lifecycle stability contract identifies aspects of the extensible software feature that are designated to remain stable across different releases of the software object;
- including the at least one prohibited language feature in the lifecycle stability contract;
- determining a requested change to the software feature of the software object;
- using the lifecycle stability contract to perform a compatibility check for the requested change to determine whether the requested change complies with the lifecycle stability contract;
- permitting the requested change in response to determining that the requested change complies with the lifecycle stability contract; and
- denying the requested change in response to determining that the requested change violates the lifecycle stability contract.

17. The computer program product of claim 16, wherein, prior to determining the requested change to the software feature, the operations comprise:
- receiving a release request to release the software object;
- determining that the software feature of the software object has been designated as the extensible software feature;
- generating the lifecycle stability contract for the extensible software feature, wherein generating the lifecycle stability contract includes:
  - determining the aspects of the extensible software feature to include in the lifecycle stability contract; and
  - including the determined aspects of the extensible software feature in the lifecycle stability contract, wherein the aspects of the extensible software feature included in the lifecycle stability contract comprise the aspects of the extensible software feature that have been designated to remain stable across different releases of the software object;
- storing the lifecycle stability contract; and
- releasing the software object in response to the release request.

18. The computer program product of claim 17, wherein the operations further comprise performing a consistency check on the extensible software feature before generating the lifecycle stability contract.

19. The computer program product of claim 17, wherein the operations further comprise:
- generating the lifecycle stability contract in response to determining that the consistency check is successful; and
- declining the request to release the software object in response to determining that the consistency check is unsuccessful.

* * * * *